United States Patent
Kang et al.

(10) Patent No.: US 9,398,539 B2
(45) Date of Patent: Jul. 19, 2016

(54) METHOD FOR TRANSMITTING SIGNAL IN MULTIPLE NODE SYSTEM

(75) Inventors: Ji Won Kang, Anyang-si (KR); Jin Young Chun, Anyang-si (KR); Su Nam Kim, Anyang-si (KR); Bin Chul Ihm, Anyang-si (KR); Sung Ho Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 242 days.

(21) Appl. No.: 13/880,661

(22) PCT Filed: Oct. 21, 2011

(86) PCT No.: PCT/KR2011/007880
§ 371 (c)(1),
(2), (4) Date: Apr. 19, 2013

(87) PCT Pub. No.: WO2012/053854
PCT Pub. Date: Apr. 26, 2012

(65) Prior Publication Data
US 2013/0194961 A1    Aug. 1, 2013

Related U.S. Application Data

(60) Provisional application No. 61/405,221, filed on Oct. 21, 2010.

(51) Int. Cl.
*H04W 52/14* (2009.01)
*H04B 7/04* (2006.01)
(Continued)

(52) U.S. Cl.
CPC .......... *H04W 52/143* (2013.01); *H04B 7/0473* (2013.01); *H04L 1/06* (2013.01);
(Continued)

(58) Field of Classification Search
CPC ....... H04B 7/0617; H04B 7/04; H04B 7/0473
USPC .......................... 375/295; 370/329; 455/561.1
See application file for complete search history.

(56) References Cited

U.S. PATENT DOCUMENTS 5,628,052 A * 5/1997 DeSantis et al. ............ 455/562.1
7,620,067 B2 * 11/2009 Niu ....................... H04B 7/0689
                                                    370/465

(Continued)

OTHER PUBLICATIONS

3GPP TR 36.814, 3rd Generation Partnership Project; Technical Specification Group Radio Access Network; Evolved Universal Terrestrial Radio Access (E-UTRA); Further Advancements for E-UTRA Physical Layer Aspects, Release 9, V9.0.0, Mar. 2010, pp. 1-104.

(Continued)

*Primary Examiner* — Guang Li
*Assistant Examiner* — Sasha Cintron Pacheco
(74) *Attorney, Agent, or Firm* — Birch, Stewart, Kolasch & Birch, LLP

(57) ABSTRACT

Provided are a method of transmitting a signal of a multi-node system. The method includes: transmitting a first signal to a user equipment via the plurality nodes by applying a first power factor; receiving power feedback information as a feedback from the user equipment; and transmitting a second signal to the user equipment via at least one node among the plurality of nodes by applying a second power factor, wherein the first power factor and the second power factor are elements for determining transmit power to be applied to the plurality of nodes, wherein the power factor information includes information for transmit power applicable to each of the plurality of nodes by measuring the first signal, and wherein the second power factor is determined based on the power factor information.

11 Claims, 9 Drawing Sheets

(51) Int. Cl.
*H04L 1/06* (2006.01)
*H04W 52/42* (2009.01)
*H04L 1/00* (2006.01)
*H04W 52/24* (2009.01)

(52) U.S. Cl.
CPC ............ *H04W 52/42* (2013.01); *H04L 1/0003* (2013.01); *H04L 1/0009* (2013.01); *H04L 1/0031* (2013.01); *H04W 52/241* (2013.01); *H04W 52/245* (2013.01)

(56) References Cited

U.S. PATENT DOCUMENTS

| | | | | |
|---|---|---|---|---|
| 7,697,625 | B2* | 4/2010 | Kim | H04B 7/0417 375/267 |
| 8,194,770 | B2* | 6/2012 | Medvedev | H04B 7/0413 375/267 |
| 8,442,144 | B2* | 5/2013 | Ylitalo et al. | 375/267 |
| 8,463,308 | B2* | 6/2013 | Matsuo et al. | 455/522 |
| 8,824,979 | B2* | 9/2014 | Yavuz | H04L 5/0005 455/114.2 |
| 8,886,245 | B2* | 11/2014 | Dayal | H04W 52/10 370/229 |
| 8,938,238 | B2* | 1/2015 | Yavuz | H04W 52/143 455/122 |
| 8,989,655 | B2* | 3/2015 | Kang | H04B 7/022 370/339 |
| 2004/0162021 | A1* | 8/2004 | Seki et al. | 455/39 |
| 2006/0039494 | A1* | 2/2006 | Kim et al. | 375/267 |
| 2009/0245213 | A1* | 10/2009 | Zaki et al. | 370/336 |
| 2009/0286482 | A1* | 11/2009 | Gorokhov et al. | 455/63.1 |
| 2010/0054353 | A1* | 3/2010 | Roh et al. | 375/260 |
| 2010/0202561 | A1* | 8/2010 | Gorokhov et al. | 375/295 |
| 2010/0220626 | A1* | 9/2010 | Das et al. | 370/252 |
| 2010/0316163 | A1* | 12/2010 | Forenza | H04B 7/024 375/296 |
| 2011/0064061 | A1* | 3/2011 | Takeuchi | H04L 1/1822 370/336 |
| 2011/0205963 | A1* | 8/2011 | Tang et al. | 370/328 |
| 2011/0222434 | A1* | 9/2011 | Chen | H04B 7/022 370/254 |
| 2012/0257567 | A1* | 10/2012 | Abraham | H04B 7/0626 370/328 |

OTHER PUBLICATIONS

Feng et al., "Downlink Power Allocation for Distributed Antenna Systems with Random Antenna Layout", 2009 IEEE 70th Vehicular Technology Conference Fall (VTC 2009-Fall), Sep. 23, 2009, pp. 1-5.

Luo et al., "Decode-and-Forward Cooperative Diversity with Power Allocation in Wireless Networks", IEEE Transactions on Wireless Communications, vol. 6, No. 3, Mar. 2007, pp. 793-799.

Wu et al., "Distributed Antenna Systems with Power Adjusted Beam Switching", 2010 IEEE 71st Vehicular Technology Conference (VT 2010-Spring), May 19, 2010, pp. 1-5.

\* cited by examiner radio access network architecture with BTS hotel and DAS (each hexagon indicates cell)

METHOD FOR TRANSMITTING SIGNAL IN MULTIPLE NODE SYSTEM

CROSS REFERENCE TO RELATED APPLICATIONS

This application is the National Phase of PCT/KR2011/007880 filed on Oct. 21, 2011, which claims priority under 35 U.S.C. 119(e) to U.S. Provisional Application No. 61/405,221 filed on Oct. 21, 2010, all of which are hereby expressly incorporated by reference into the present application.

TECHNICAL FIELD

The present invention relates to wireless communications, and more particularly, to a method and apparatus for transmitting a signal in a multi-node system.

BACKGROUND ART

A data transfer amount of a wireless network has been rapidly increased in recent years. It is because various devices, e.g., a smart phone, a tablet personal computer (PC), or the like, that require machine-to-machine (M2M) communication and a high data transfer amount have been introduced and distributed. To satisfy the required high data transfer amount, a carrier aggregation (CA) technique, a cognitive radio (CR) technique, or the like for effectively using more frequency bands and a multiple antenna technique, a multiple base station cooperation technique, or the like for increasing data capacity within a limited frequency have recently drawn attention.

In addition, the wireless network has been evolved in a direction of increasing density of nodes capable of accessing to an area around a user. Herein, the node implies an antenna (or antenna group) which is separated from a distributed antenna system (DAS) by more than a certain distance. However, the node is not limited to this definition, and thus can also be used in a broader sense. That is, in a broad sense, the node may be a pico-cell eNB (PeNB), a home eNB (HeNB), a remote radio head (RRH), a remote radio unit (RRU), a relay, a distributed antenna (group), etc. A wireless communication system having nodes with higher density can provide higher system performance by cooperation between the nodes. That is, better system performance can be achieved when one base station controller manages transmission and reception of respective nodes and thus the nodes operate as if they are antennas or an antenna group for one cell, in comparison with a case where the respective nodes operate as an independent base station (BS), advanced BS (ABS), Node-B (NB), eNode-B (eNB), access point (AP), etc., and thus do not cooperate with each other. Hereinafter, a wireless communication system including a plurality of nodes is referred to as a multi-node system.

If each node of the multi-node system performs scheduling and handover by having its own identifier (ID), such a multi-node system can be regarded as a multi-cell system. If a coverage of each cell (i.e., node) is overlaid in the multi-cell system, such a multi-cell system is called a multi-tier network.

In the multi-node system, a BS may transmit and receive data by selecting a plurality of nodes, or a user equipment (UE) may transmit and receive data with respect to the plurality of nodes. In this case, a channel established between the UE and each node does not have a uniform channel state. As such, for a case where a channel state is not uniform, there is a need for a method capable of using the same modulation and coding scheme (MCS) in each node. In addition, if a different MCS is used for each node, there is a need for a method capable of maximizing link efficiency.

SUMMARY OF INVENTION

Technical Problem

The present invention provides a signal transmission method and apparatus in a multi-node system.

Technical Solution

According to an aspect of the present invention, a method of transmitting a signal of a multi-node system employing a plurality of nodes and a base station that can be controlled by being connected with each of the plurality of nodes is provided. The method includes: transmitting a first signal to a user equipment via the plurality nodes by applying a first power factor; receiving power factor information as a feedback from the user equipment; and transmitting a second signal to the user equipment via at least one node among the plurality of nodes by applying a second power factor, wherein the first power factor and the second power factor are elements for determining transmit power to be applied to the plurality of nodes, wherein the power factor information includes information for transmit power applicable to each of the plurality of nodes by measuring the first signal, and wherein the second power factor is determined based on the power factor information.

In the aforementioned aspect of the present invention, the power factor information may include a power factor preferred by the user equipment for each of the plurality of nodes.

In addition, the power factor preferred by the user equipment may be provided in an index form of a predetermined table between the base station and the user equipment.

In addition, the power factor information may include a node index for indicating a specific node among the plurality of nodes and a power control field for requesting an increase or decrease of transmit power of the specific node.

In addition, the second power factor may increase the transmit power for a node of which a channel state is below a threshold and decrease the transmit power for a node of which a channel state is above the threshold among the plurality of nodes.

In addition, the second signal may include codewords, and the same modulation and coding scheme (MCS) may be applied to the codewords.

In addition, the power factor information may include information on one MCS that can be commonly applied to at least one node which transmits the second signal.

In addition, the second power factor may determine the transmit power to zero for a node of which a channel state is below a threshold and increase the transmit power for a node of which a channel state is above the threshold among the plurality of nodes.

In addition, the method may further include transmitting information indicating the first power factor or the second power factor to the user equipment.

In addition, the information indicating the first power factor or the second power factor may be included in control information transmitted by the base station.

According to another aspect of the present invention, a method of transmitting a signal of a user equipment in a multi-node system employing a plurality of nodes and a base station that can be controlled by being connected with each of the plurality of nodes is provided. The method includes:

receiving a first signal to which a first power factor is applied via the plurality of nodes; feeding back power factor information to the base station; and receiving a second signal to which a second power factor is applied via at least one node among the plurality of nodes, wherein the first power factor and the second power factor are elements for determining transmit power to be applied to the plurality of nodes, wherein the power factor information includes information for transmit power applicable to each of the plurality of nodes by measuring the first signal, and wherein the second power factor is determined based on the power factor information.

In the aforementioned aspect of the present invention, the power factor information may include a power factor preferred by the user equipment for each of the plurality of nodes.

In addition, the power factor preferred by the user equipment may be provided in an index form of a predetermined table between the base station and the user equipment.

In addition, the power factor information may include a node index for indicating a specific node among the plurality of nodes and a power control field for requesting an increase or decrease of transmit power of the specific node.

In addition, the power factor information may include information on one MCS that can be commonly applied to at least one node which transmits the second signal.

In addition, the method may further include feeding back information on a precoding matrix applicable to the plurality of nodes.

Advantageous Effects

According to the present invention, a plurality of nodes can transmit a codeword by using the same modulation and coding scheme (MCS) in a multi-node system. In addition, link efficiency of the multi-node system can be maximized.

MODE FOR INVENTION

The technology described below can be used in various multiple access schemes such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA2000. The TDMA can be implemented with a radio technology such as global system for mobile communications (GSM)/general packet radio service (GPRS)/enhanced data rates for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunications system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is evolved from the LTE. The IEEE 802.11m is evolved from the IEEE 802.16e.

Figure 1:
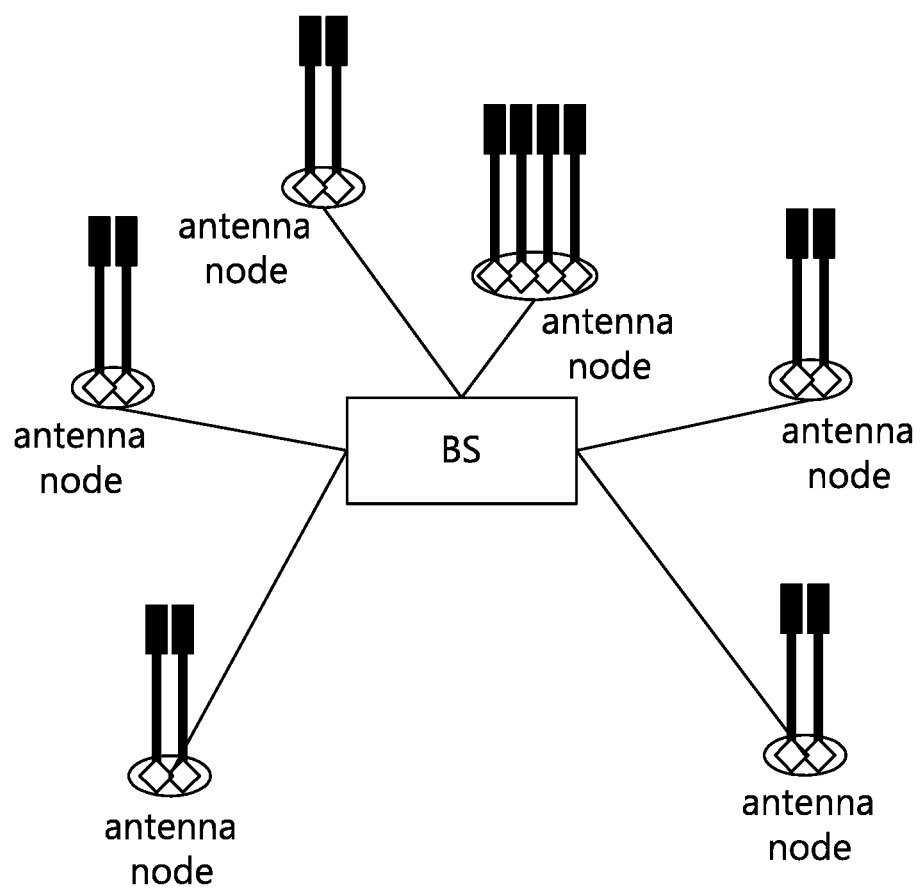
FIG. 1 shows an example of a multi-node system.

FIG. 1 shows an example of a multi-node system.

Referring to FIG. 1, the multi-node system includes a base station (BS) and a plurality of nodes.

The BS provides a communication service to a specific geographical region. The BS is generally a fixed station that communicates with a user equipment (UE) and may be referred to as another terminology, such as an evolved Node-B (eNB), a base transceiver system (BTS), an advanced base station (ABS), etc.

A distributed antenna is shown in FIG. 1 as an example of a node, and in this sense, is denoted by an antenna node (AN). However, the node is not limited to the distributed antenna, and thus may be, for example, a macro eNB antenna, a picocell eNB (PeNB), a home eNB (HeNB), a remote radio head (RRH), a relay, etc. The node is also referred to as a point.

From the viewpoint of the UE, the node can be identified or indicated by using a reference signal or a pilot signal. The reference signal (or pilot signal) is a signal known to a transmitting side and a receiving side, and implies a signal used for channel measurement, data demodulation, etc. For example, the reference signal may be a channel status indication reference signal (CSI-RS) defined in 3GPP LTE-A. In an LTE/LTE-A system, one CSI-RS configuration can be mapped to one node. On the basis of the CSI-RS configuration, the UE can identify or indicate a node and can obtain channel state information on the node. By considering this, the node or the point can be replaced with the CSI-RS configuration in the present invention described below. The CSI-RS configuration may include information regarding the number of antenna ports, a resource element (RE) in use, a transmission period, an offset of a transmission time, etc.

Referring back to FIG. 1, from a physical viewpoint, the AN is connected to the BS in a wired/wireless fashion, and each AN may consist of one antenna or an antenna group (i.e., a plurality of antennas). Antennas belonging to one AN may be geographically located within several meters and show the same feature. In the multi-node system, the AN serves as an access point (AP) to which the UE can access.

In a case where the node consists of antennas in the multi-node system as described above, it may be called a distributed antenna system (DAS). That is, the DAS is a system in which antennas (i.e., nodes) are deployed in various positions in a geographically distributed manner, and these antennas are managed by the BS. The DAS is different from a conventional centralized antenna system (CAS) in which antennas of the BS are centralized in a cell center.

If the antennas are deployed in a geographically distributed manner, it may imply that, if one receiver receives the same signal from antennas, the antennas are deployed such that a channel state difference between each antenna and the receiver is greater than or equal to a specific value. If the antennas are deployed in a centralized manner, it may imply that the antennas are deployed in a localized manner such that a channel state difference between each antenna and one receiver is less than a specific value. The specific value can be determined variously according to a frequency, service type, etc., used by the antennas.

Figure 2:
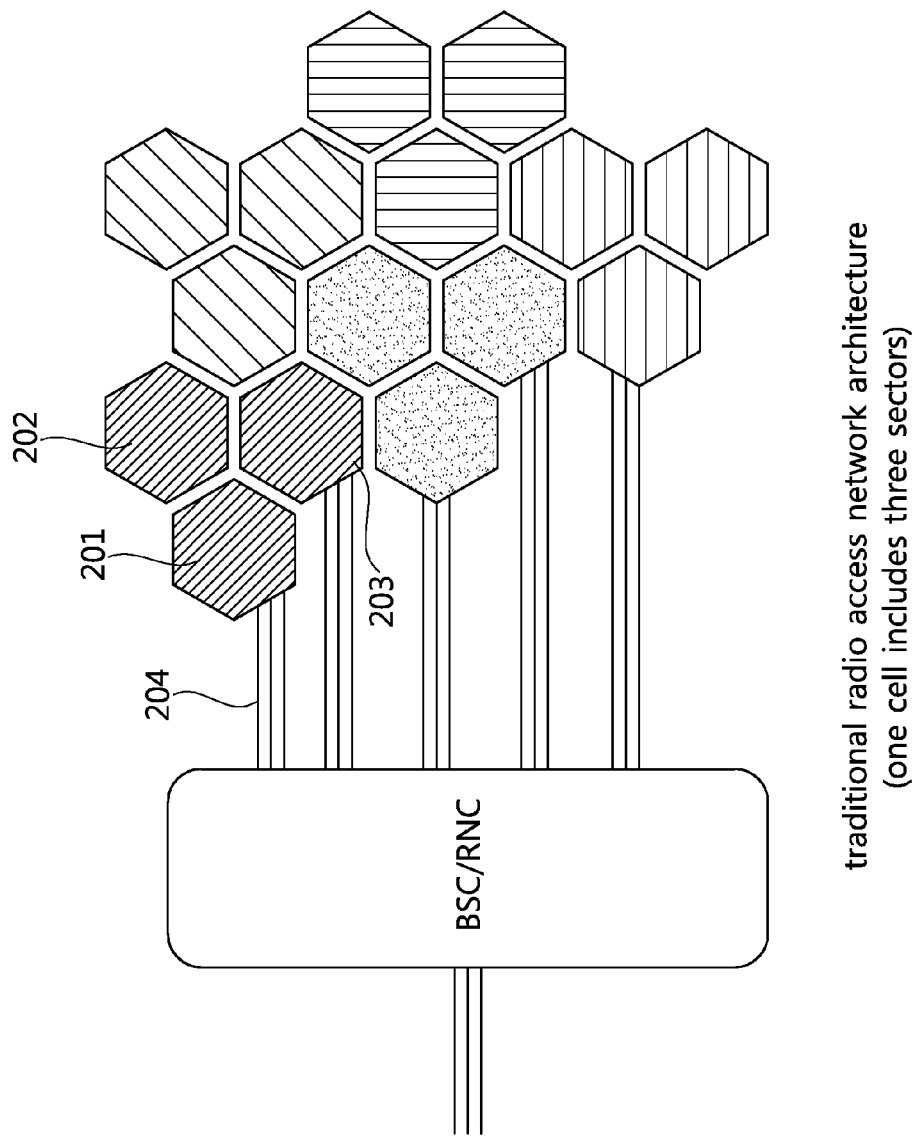
FIG. 2 shows a radio access structure of the conventional wireless communication system.

FIG. 2 shows a radio access structure of the conventional wireless communication system.

Referring to FIG. 2, the conventional wireless communication system may be a cellular system. In the cellular system, a BS controls three sectors (e.g., 201, 202, and 203) constituting a cell. Each BS is connected to a base station controller/radio network controller (BSC/RNC, hereinafter, collectively called a BSC) via a backbone network 204. In the conventional wireless communication system, each BS is deployed in a cell controlled by itself in general.

Figure 3:
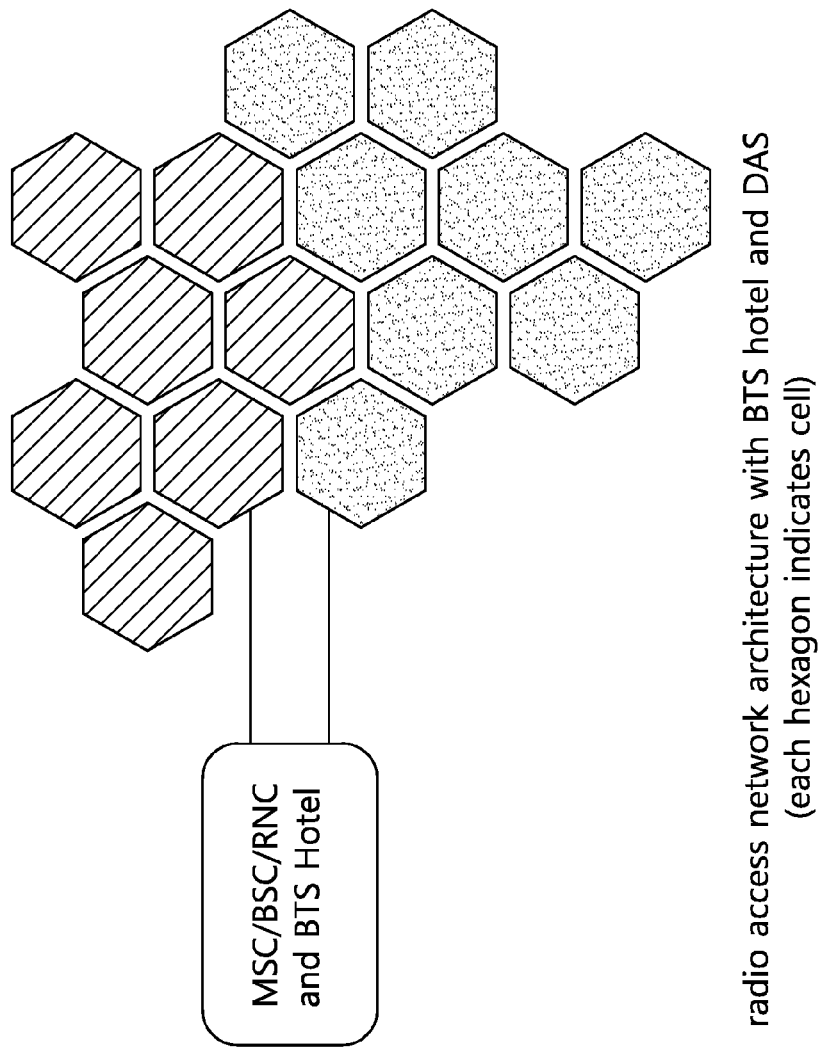
FIG. 3 shows a radio access structure of a wireless communication system to which the concept of a base transceiver system (BTS) hotel is applied.

FIG. 3 shows a radio access structure of a wireless communication system to which the concept of a BTS hotel is applied.

Referring to FIG. 3, each of BTSs can be connected through ANs deployed in a distributed manner in cells, an optical fiber, etc., and the respective BTSs are installed in a specific region in a localized manner instead of being deployed in cells managed by the BTSs. When a plurality of BTSs which manage such distributed cells are deployed and managed by grouping the BTSs in a specific region, it is called a BTS hotel. In concept, the BTS hotel has an advantage in that costs for a land, a building, etc., in which the BTS is installed can be decreased, and costs of maintenance/management/repair can be decreased. In addition, the BTSs and the BSC/RNC can be installed in one place all together to increase backhaul capacity. The concept of the BTS hotel can be applied to a distributed antenna system.

Figure 4:
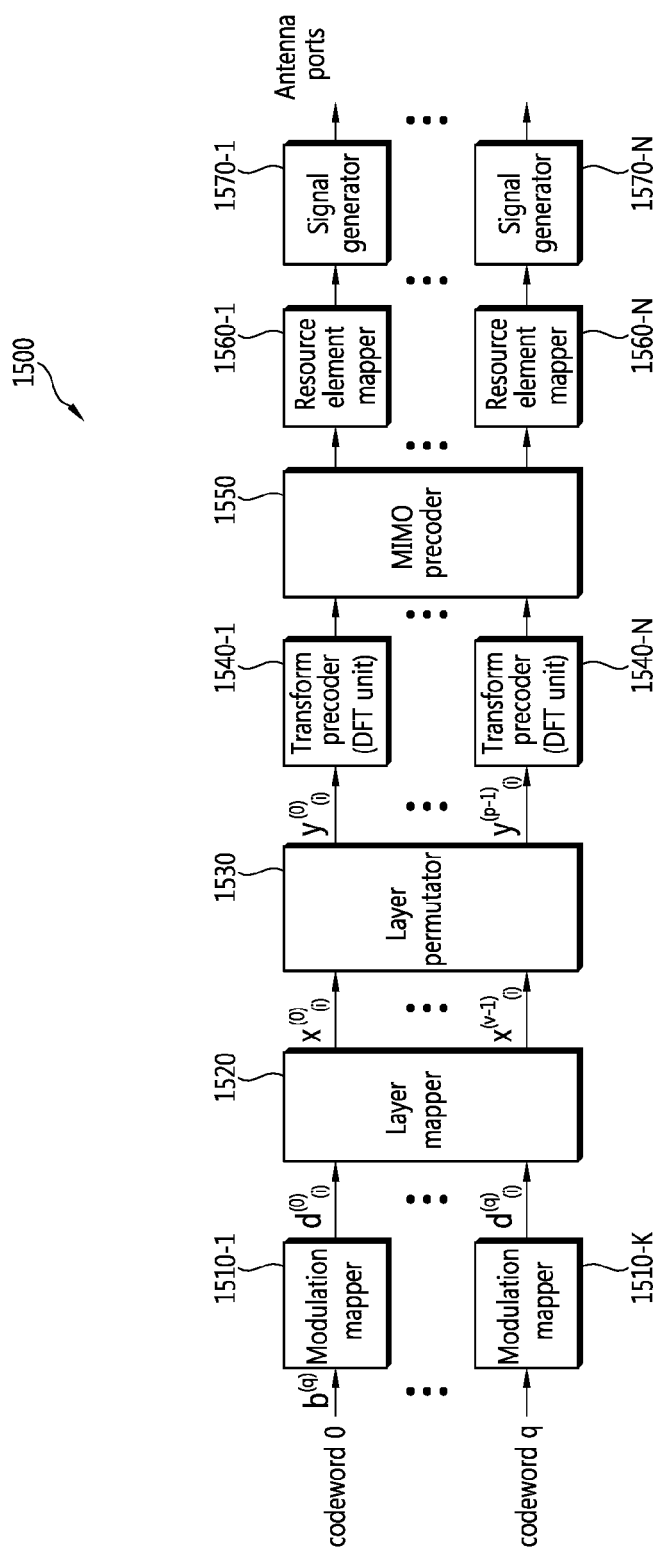
FIG. 4 is a block diagram showing an exemplary structure of a transmitter included in a centralized antenna system.

FIG. 4 is a block diagram showing an exemplary structure of a transmitter included in a centralized antenna system.

Referring to FIG. 4, a transmitter 1500 may include modulation mappers 1510-1, ..., 1510-K, a layer mapper 1520, a layer permutator 1530, transform precoders (DFT units) 1540-1, ..., 1540-N, a MIMO precoder 1550, resource element mappers 1560-1, ..., 1560-N, and signal generators 1570-1, ..., 1570-N.

The modulation mappers 1510-1, ..., 1510-K receive a codeword and map the codeword to a modulation symbol that expresses a location on a signal constellation. Herein, the codeword implies coded data obtained by performing encoding according to a predetermined coding scheme. Although not shown, the codeword may be input to the modulation mappers 1510-1, ..., 1510-K after being subjected to scrambling. A codeword q can be expressed by Equation 1 below.

$$b^{(q)}(k)=[b^{(q)}(0)\ b^{(q)}(1)\ \ldots\ b^{(q)}(N_{bit}^{(q)}-1)]$$ [Equation 1]

In Equation 1, q denotes a codeword index, and $N^{(q)}_{bit}$ denotes the number of bits of the codeword q. k has a value in the range of 0 to $N^{(q)}_{bit}-1$.

A modulation scheme is not limited to a specific modulation scheme, and may be an m-phase shift keying (m-PSK) or an m-quadrature amplitude modulation (m-QAM). Examples of the m-PSK include binary PSK (BPSK), quadrature PSK (QPSK), and 8-PSK. Examples of the m-QAM include 16-QAM, 64-QAM, and 256-QAM. A modulation symbol modulated by the modulation mapper has a complex value. The codeword q mapped to the symbol on the signal constellation can be expressed by a modulation symbol sequence as expressed by Equation 2 below.

$$d^{(q)}(i)=d^{(q)}(0),\ \ldots\ d^{(q)}(M^{(q)}_{symb}-1)$$ [Equation 2]

In Equation 2, q denotes a codeword index, and $M^{(q)}_{symb}$ denotes the number of symbols of the codeword q.

The layer mapper 1520 receives a modulation symbol sequence (i.e., $d^{(q)}(i)$) from the modulation mappers 1510-1, ..., 1510-K and performs codeword-to-layer mapping. The layer mapper can also be called a codeword-stream mapper. A stream is the same concept as a layer in LTE/LTE-A. A modulation symbol x(i) on which the codeword-to-layer mapping is performed can be expressed by Equation 3 below.

$$x(i)=[x^{(0)}(i),\ \ldots,\ x^{(v-1)}(i)]^T$$ [Equation 3]

In Equation 3, v denotes the number of layers, and i=0, 1, ..., $M^{layer}_{symb}-1$.

$M^{layer}_{symb}$ denotes the number of modulation symbols per layer.

If the number of codewords is 1 or 2, codeword-to-layer mapping for spatial multiplexing can be performed as defined in Table 1 below.

TABLE 1

| Number of layers | Number of codewords | Codeword-to-layer mapping i = 0, 1, ..., $M^{layer}_{symb} - 1$ | |
|---|---|---|---|
| 1 | 1 | $x^{(0)}(i) = d^{(0)}(i)$ | $M^{layer}_{symb} = M^{(0)}_{symb}$ |
| 2 | 2 | $x^{(0)}(i) = d^{(0)}(i)$<br>$x^{(1)}(i) = d^{(1)}(i)$ | $M^{layer}_{symb} = M^{(0)}_{symb} = M^{(1)}_{symb}$ |
| 2 | 1 | $x^{(0)}(i) = d^{(0)}(2i)$<br>$x^{(1)}(i) = d^{(0)}(2i + 1)$ | $M^{layer}_{symb} = M^{(0)}_{symb}/2$ |
| 3 | 2 | $x^{(0)}(i) = d^{(0)}(i)$<br>$x^{(1)}(i) = d^{(1)}(2i)$<br>$x^{(2)}(i) = d^{(1)}(2i + 1)$ | $M^{layer}_{symb} = M^{(0)}_{symb} = M^{(1)}_{symb}/2$ |
| 4 | 2 | $x^{(0)}(i) = d^{(0)}(2i)$<br>$x^{(1)}(i) = d^{(0)}(2i + 1)$<br>$x^{(2)}(i) = d^{(1)}(2i)$<br>$x^{(3)}(i) = d^{(1)}(2i + 1)$ | $M^{layer}_{symb} = M^{(0)}_{symb}/2 = M^{(1)}_{symb}/2$ |

The layer permutator 1530 can perform modulation symbol level permutation (or interleaving) on the modulation symbol x(i) on which codeword-to-layer mapping is performed. Permutation may be performed in a unit of bit, in a unit of modulation order, in a unit of modulation order×a DFT size, and in a unit of modulation order×DFT size×(the number of SC-FDMA symbols of a slot or a subframe). When the modulation symbol level permutation is performed, a modulation symbol y(i) to be sent to each antenna port p is output as x(i). A modulation symbol on which the modulation symbol level permutation is performed is denoted by y(i).

That is, if the modulation symbol, i.e., $x(i)=[x^{(0)}(i),\ \ldots,\ x^{(v-1)}(i)]^T$, i=0, 1, ..., $M^{layer}_{symb}-1$, on which codeword-to-layer mapping is performed is given as an input vector of the layer permutator 1530, the output vector, i.e., $y(i)=[y^{(0)}(i),\ \ldots,\ y^{(p-1)}(i)]^T$, i=0, 1, ..., $M^{layer}_{symb}-1$, on which the modulation symbol level permutation is performed is generated.

The transform precoders 1540-1, ..., 1540-N receive the modulation symbol y(i) on which the modulation symbol level permutation is performed, and perform a DFT operation on the received symbol. The DFT operation and the permutation may be performed in two ways, i.e., (1) the DFT operation is performed after performing permutation, and (2) the permutation is performed after performing the DFT operation.

The MIMO precoder 1550 processes an input symbol by using a MIMO scheme according to the multiple transmit (Tx) antennas. That is, the MIMO precoder 1550 can perform layer-to-antenna mapping. The MIMO precoder 1550 distributes an antenna-specific symbol to the resource element mappers 1560-1, ..., 1560-N for a path of a specific antenna.

The resource element mappers 1560-1, ..., 1560-N allocate the antenna-specific symbol to a proper resource element, and perform multiplexing according to a user. The signal generators 1570-1, . . . , 1570-N perform an inverse fast Fourier transform (IFFT) operation or an inverse Fourier transform (IFT) operation and thereafter perform digital to analog conversion (DAC). The signal generators 1570-1, . . . , 1570-N may include an IFFT unit for performing an IFFT operation and a cyclic prefix (CP) insertion unit for inserting a CP. An analog signal output from the signal generators 1570-1, . . . , 1570-N is transmitted through a physical antenna port.

As described above, in the conventional wireless communication system, the transmitter includes a layer mapper for mapping a codeword to a layer (stream) and a MIMO precoder. In general, the maximum number of transmissible streams is the same as the number of ranks of a channel between a transmitter and a receiver. A codeword (or a MIMO layer in IEEE 802.16) to which the same modulation coding scheme (MCS) is applied can be mapped to a plurality of streams. For example, in LTE-A, up to two codewords transmitted to one UE can be mapped to up to 4 streams. In IEEE 802.16m, one codeword transmitted to one UE can be mapped to up to 8 streams (in case of IEEE 802.16m, a MIMO encoder performs mapping between a codeword and a stream).

After performing the mapping between the codeword and the stream, MIMO precoding is performed to map the stream to an antenna (called an antenna port in LTE-A). The MIMO precoding primarily uses linear precoding. Therefore, if the number of streams is denoted by $N_s$ and the number of Tx antenna (or antenna ports) is denoted by $N_t$, then the MIMO precoding can be expressed by an $N_s \times N_t$ matrix.

However, in order to directly apply the aforementioned MIMO precoding to the multi-node system, the total number of Tx antennas of all nodes in the multi-node system is $N_t$. Then, the UE must select and feed back a precoding matrix index (PMI) for the $N_t$ Tx antennas. The PMI provides information on a precoding matrix suitable for a channel in codebook-based precoding. The PMI may be a simple matrix index in a codebook.

Meanwhile, the value $N_t$ may be various according to the number of nodes included in the multi-node system and the number of Tx antennas of each node, and a greater number of Tx antennas can be provided in comparison with the conventional 8 Tx antennas. That is, the multi-node system may have a greater number of Tx antennas than the conventional CAS or may have a various number of Tx antennas, which results in a problem in that the number of codebooks to be defined or the number of MIMO precoding matrices is increased.

In addition, a feedback of a CQI is a feedback of quality of an effective channel corresponding to each codeword, and if the multi-node system uses a plurality of codewords, each codeword can be transmitted to a UE through some Tx antennas among all Tx antennas. In this case, there is a problem in that the UE cannot know to which node the some Tx antennas are included. There is a need for a communication method and apparatus capable of solving this problem.

Figure 5:
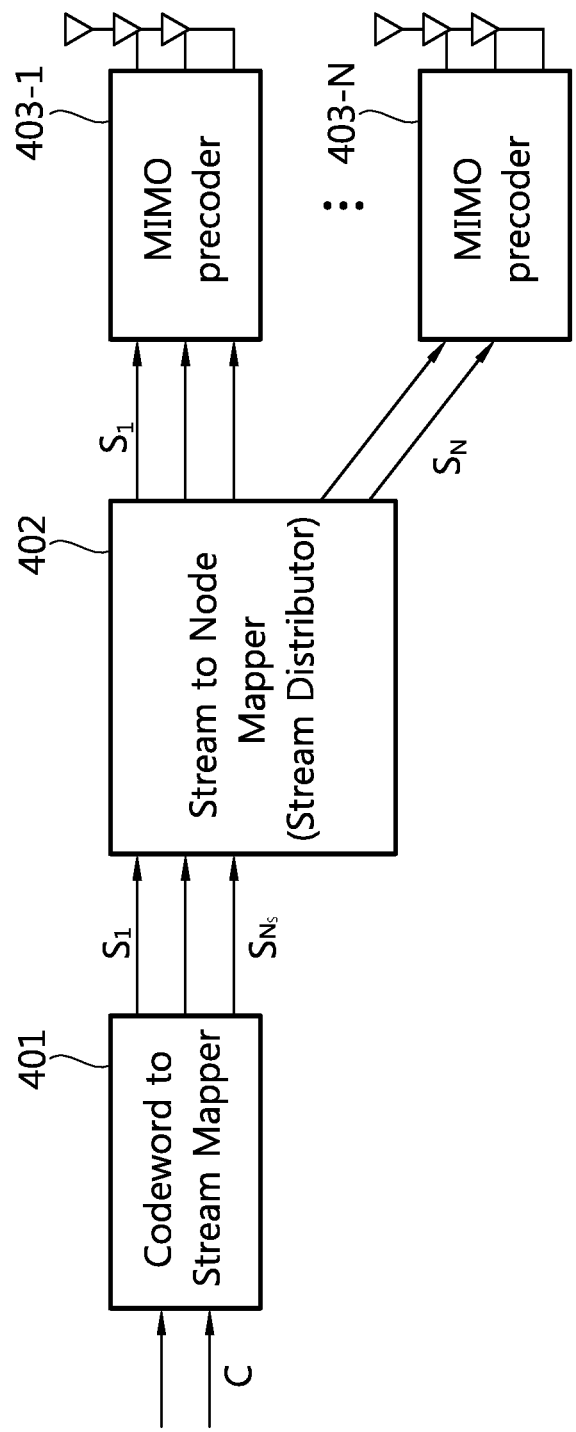
FIG. 5 shows a signal transmission system according to an embodiment of the present invention.

FIG. 5 shows a signal transmission system according to an embodiment of the present invention.

Referring to FIG. 5, the signal transmission system includes a codeword-stream mapper 401, a stream-node mapper 402, and MIMO precoders 403-1, . . . , 403-N. That is, the signal transmission system of FIG. 5 differs from the transmitter of FIG. 3 in that the stream-node mapper 402 is added between the codeword-stream mapper 401 and the MIMO precoders 403-1, . . . , 403-N.

The codeword-stream mapper 401 maps a codeword to a stream (or layer). The stream-node mapper 402 maps the stream to each node. That is, the stream-node mapper 402 takes a role of distributing streams to a plurality of nodes. The MIMO precoders 403-1, . . . , 403-N perform MIMO precoding at the respective nodes. The MIMO precoders 403-1, . . . , 403-N can be implemented at the respective nodes.

The stream-node mapper 402 is necessary because streams transmitted to a specific UE or a UE group can be transmitted in a plurality of distributed nodes instead of being transmitted in one node. If the plurality of distributed nodes transmit the streams, a rank is increased in a channel with respect to the UE, and a signal to noise ratio (SNR) is increased, which may result in the increase in a throughput.

The stream-node mapper 402 can be characterized as follows.

1. The total number of streams allocated to each node is greater than or equal to the number of input streams.
2. The number of streams allocated to one node is less than or equal to the number of input streams.
3. All input streams are mapped to at least one node.
4. A steam output to one node is a subset of all input streams.

Assume that input streams input to the stream-node mapper 402 are denoted by $s=[s_1, \ldots, s_{N_s}]^T$, and streams output to an $i^{th}$ node are denoted by $$s_i = [s'_1, \ldots, s'_{N_{s,i}}]^T.$$

Then, the input streams and the streams output to the $i^{th}$ node can be expressed by Equation 4 below.

$$s_i = U_i s \qquad \text{[Equation 4]}$$

In Equation 4 above, $U_i$ denotes an $N_{s,i} \times N_s$ matrix, and each row of $U_i$ consists of any $1 \times N_s$ unit vector. The unit vector is a vector of which only one element is 1 and the remaining elements are 0. In addition, $U_i$ does not have any two rows identical to each other. Therefore, a rank of the matrix $U_i$ is $N_{s,i}$.

For example, assume that the stream-node mapper 402 maps three streams to two nodes (i.e., a node 1 and a node 2). Then, $U_1$ which maps a stream to the node 1 and $U_2$ which maps a stream to the node 2 can be expressed by Equation 5 below.

$$U_1 = \begin{bmatrix} 1 & 0 & 0 \\ 0 & 1 & 0 \end{bmatrix}, \quad U_2 = \begin{bmatrix} 0 & 0 & 1 \\ 0 & 1 & 0 \end{bmatrix} \qquad \text{[Equation 5]}$$

$U_1$ and $U_2$ of Equation 5 above show an example in which, $s_1$ and $s_2$ are mapped to the node 1 and $s_3$ and $s_2$ are mapped to the node 2 in an orderly manner among three streams $s_1$, $s_2$, and $s_3$. Then, MIMO precoding suitable for an input consisting of $s_1$ and $s_2$ is performed at the node 1, and MIMO precoding suitable for an input consisting of $s_3$ and $s_2$ is performed at the node 2. In case of applying linear precoding, MIMO precoding can be performed by using an $N_{s,i} \times N_{t,i}$ matrix at an $i^{th}$ node. Herein, $N_{t,i}$ denotes the number of Tx antennas of the $i^{th}$ node.

As described above, stream-node mapping information indicating mapping between a stream and a node can be expressed in a matrix. The stream-node mapping information can be signaled by a BS to a UE or can be fed back by the UE to the BS. For this, a mapping relation between the stream and the node can be predetermined, and a signaling overhead can be decreased by providing the stream-node mapping information in an index format with respect to the predetermined mapping relation.

Table 2 below shows an example of indicating stream-node mapping information in an index format if the number of streams is 3 (i.e., $N_s$=3) and the number of nodes is 2.

TABLE 2

| Index | $U_1$ | $U_2$ |
|---|---|---|
| 0 | $\begin{bmatrix} 1 & 0 & 0 \\ 0 & 1 & 0 \end{bmatrix}$ | $[0\ 0\ 1]$ |
| 1 | $\begin{bmatrix} 1 & 0 & 0 \\ 0 & 1 & 0 \end{bmatrix}$ | $\begin{bmatrix} 0 & 1 & 0 \\ 0 & 0 & 1 \end{bmatrix}$ |
| 2 | $\begin{bmatrix} 1 & 0 & 0 \\ 0 & 1 & 0 \end{bmatrix}$ | $\begin{bmatrix} 1 & 0 & 0 \\ 0 & 0 & 1 \end{bmatrix}$ |
| 3 | $\begin{bmatrix} 1 & 0 & 0 \\ 0 & 0 & 1 \end{bmatrix}$ | $\begin{bmatrix} 0 & 1 & 0 \\ 0 & 0 & 1 \end{bmatrix}$ |
| 4 | $\begin{bmatrix} 1 & 0 & 0 \\ 0 & 1 & 0 \\ 0 & 0 & 1 \end{bmatrix}$ | $[0\ 0\ 1]$ |
| 5 | $\begin{bmatrix} 1 & 0 & 0 \\ 0 & 1 & 0 \\ 0 & 0 & 1 \end{bmatrix}$ | $\begin{bmatrix} 0 & 1 & 0 \\ 0 & 0 & 1 \end{bmatrix}$ |
| 6 | $\begin{bmatrix} 1 & 0 & 0 \\ 0 & 1 & 0 \\ 0 & 0 & 1 \end{bmatrix}$ | $\begin{bmatrix} 1 & 0 & 0 \\ 0 & 1 & 0 \\ 0 & 0 & 1 \end{bmatrix}$ |
| 7 | $\begin{bmatrix} 1 & 0 & 0 \\ 0 & 1 & 0 \\ 0 & 0 & 1 \end{bmatrix}$ | None |

In the example of Table 2 above, a node for transmitting more streams is fixed to the node 1 to decrease the number of indices. Therefore, additional signaling may be necessary to determine which node will transmit more streams. In a first case, such signaling can be included in information for reporting an order of a preferred node by a UE to a BS explicitly or implicitly. For example, if the UE feeds back CQI or path loss information for each node, the preferred node can be determined implicitly by the CQI or path loss information. Alternatively, the UE may explicitly report the preferred node. In a second case, such signaling can be included in control information reported by the BS to the UE. The control information implies downlink control information (DCI), and can be transmitted through a control channel such as a physical downlink control channel (PDCCH), a physical downlink shared channel (PDSCH), A-MAP, etc.

In Table 2 above, an index 7 uses only a node 1, and such an index may be unnecessary since it is enough to decrease the number of supported nodes. However, if the number of supported nodes is fixed semi-statically, such an index may be necessary to off one node instantaneously.

The stream-node mapping information may be given in a bitmap format without being limited to the index format. If a system is configured such that the same stream is not mapped to a plurality of nodes, a bitmap format can be used to indicate a specific node to which a specific stream is mapped, without having to use Table 2 above. For example, assume that three streams are mapped to two nodes. If each bit of a bitmap is 0, it may indicate mapping to a first node, and if each bit is 1, it may indicate mapping to a second node. Then, if bitmap information of {011} is given to three streams, it may indicate that a first stream is mapped to the first node, and second and third streams are mapped to the second node.

Alternatively, stream-node mapping information may be configured in a format of indicating an index of a stream mapped to each node. For example, the UE can feed back to the BS the stream-node mapping information indicating contents in which a stream 1 is mapped to a node 1, and streams 1 and 2 are mapped to a node 2. Of course, the BS can also transmit to the UE the aforementioned format of stream-node mapping information by including the information to control information.

In the multi-node system which uses the signal transmission system of FIG. 5, the UE must feed back not only a PMI for all nodes but also a PMI for each node allocated to the UE when feeding back the PMI to the BS. By feeding back a per-node PMI, the BS can apply a MIMO precoder corresponding to a PMI for each node without having to configure a complex codebook and MIMO precoder considering a Tx antenna configuration of all nodes, thereby achieving a simple and clear system configuration.

Figure 6:
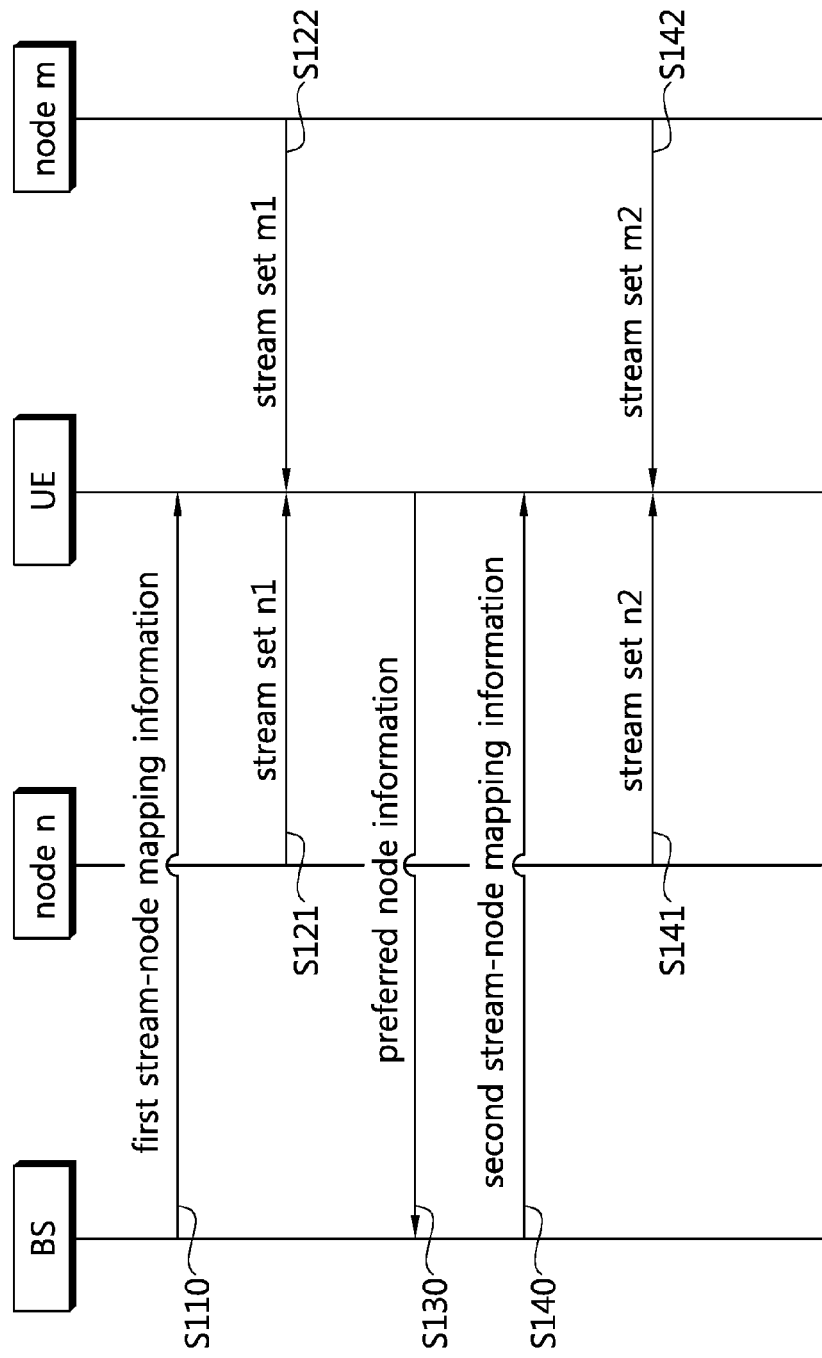
FIG. 6 shows a method of performing communication in a multi-node system using a structure of a signal transmission system of FIG. 5.

FIG. 6 shows a method of performing communication in a multi-node system using a structure of the signal transmission system of FIG. 5.

Referring to FIG. 6, a BS transmits first stream-node mapping information to a UE (step S110). A node n transmits a stream set n1 to the UE (step S121). A node m transmits a stream set m1 to the UE (step S122). The stream set n1 and the stream set m1 are transmitted according to the first stream-node mapping information.

The UE transmits preferred node information to the BS (step S130). The BS transmits second stream-node information by determining a stream-node mapping relation to be applied to the UE on the basis of the preferred node information (step S140). The node n1 and the node m1 transmit the stream set n2 and the stream set m2 respectively according to the second stream-node mapping information (steps S141 and S142).

Although the multi-node system can perform a process of mapping a codeword to a node by using a codeword-stream mapper and a stream-node mapper, the present invention is not limited thereto. In other words, the process of mapping the codeword to the node can be performed by the codeword-stream mapper. That is, the codeword-stream mapper may map streams respectively to a plurality of nodes. Then, a MIMO precoder can perform MIMO precoding by using the streams mapped to the respective nodes.

Figure 7:
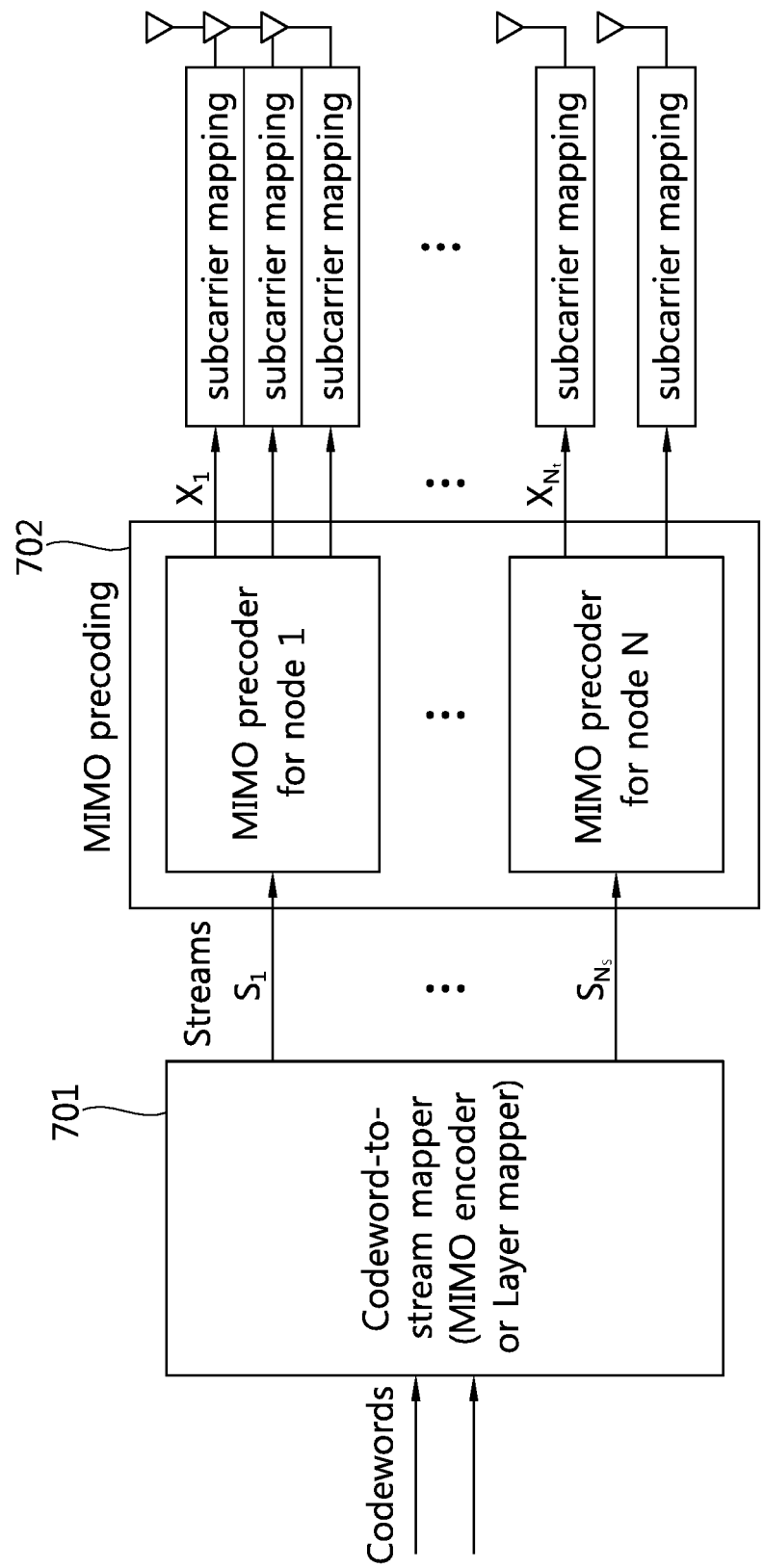
FIG. 7 shows a signal transmission system according to another embodiment of the present invention.

FIG. 7 shows a signal transmission system according to another embodiment of the present invention.

FIG. 7 differs from FIG. 5 in that a codeword-stream mapper 701 maps an input codeword to a stream for each node. A MIMO precoder 702 performs MIMO precoding on the stream for each node.

Assume that $N_s$ streams output by the codeword-stream mapper 701 are denoted by $s=[s_1\ s_2\ \ldots\ s_{N_s}]^T$, and Nt outputs which are subjected to MIMO precoding by the MIMO precoder 702 are denoted by $x=[x_1\ x_2\ \ldots\ x_{N_t}]^T$. If the MIMO precoder 702 uses linear precoding, a MIMO precoding matrix V can be expressed by an $N_t \times N_s$ matrix, and has a relation of x=V s.

If the number of Tx antennas of a node i is denoted by $N_{t,i}$, an $N_{t,1} \times 1$ vector $x_i$ which is transmitted at each node can be configured by dividing elements of x respectively into $N_{t,1}$, $N_{t,2}, \ldots, N_{t,N}$ parts. Herein, $i=1, 2, \ldots, N$. Therefore, a relation of is $x=[x_1^T x_2^T \ldots x_N^T]^T$ is satisfied. Likewise, a MIMO precoding matrix $V_i$ corresponding to each node can be configured by dividing each row of the MIMO precoding matrix V into $N_{t,1}, N_{t,2}, \ldots, N_{t,N}$ rows, respectively. That is, $V=[V_1^T V_2^T \ldots V_N^T]^T$. Therefore, a Tx vector $x_i$ transmitted at each node and a MIMO precoding matrix $V_i$ at each node can be expressed by Equation 6 below.

$$x_i = V_i s, i=1, \ldots, N \qquad \text{[Equation 6]}$$

In a matrix $V_i$ of Equation 6 above, all columns have zero vector except for columns corresponding to streams allocated to an $i^{th}$ node.

For example, it is assumed that, in any system consisting of two nodes, each node comprising 4 transmit antennas, and of 4 transmit streams (i.e., $N_{t,i}=N_{t,2}=4$, $N_s=4$), streams 1 and 2 are mapped to a first node and streams 2, 3, and 4 are mapped to a second node. Third and fourth columns of a 4×4 precoding matrix $V_1$ applied to a node 1 have elements of 0, and a first column of a 4×4 precoding matrix $V_2$ applied to a node 2 has elements of 0.

Assume that $\tilde{V}_i$ denotes a MIMO precoding matrix reduced to an $N_{t,i} \times N_{s,i}$ size by eliminating columns having a value 0 from a MIMO precoding matrix $V_i$. Herein, $N_{s,i}$ denotes the number of streams transmitted at the $i^{th}$ node. In addition, assume that, in a Tx stream matrix s, only streams transmitted at the node i are gathered to express an $N_{s,i} \times 1$ vector $s_i$ (in the example above, $$s_1 = [s_1 s_2]^T, s_2 = [s_2 s_3 s_4]^T).$$

In this case, $x_i$ can be expressed by Equation 7 below.

$$x_i = \tilde{V}^i s_i, i=1, \ldots, N \qquad \text{[Equation 7]}$$

If $H_i$ denotes an $N_r \times N_{t,i}$ matrix corresponding to an $i^{th}$ node in an $N_r \times N_t$ channel matrix H for the UE (where $N_r$ is the number of receive (Rx) antennas of the UE), an Rx signal y of the UE can be expressed by Equation 8 below.

$$\begin{aligned} y &= Hx + z \qquad \text{[Equation 8]} \\ &= HVs + z \\ &= \sum_{i=1}^{N} H_i x_i + z \\ &= \sum_{i=1}^{N} H_i V_i s + z \\ &= \sum_{i=1}^{N} H_i \tilde{V}_i s_i + z \end{aligned}$$

In Equation 8 above, z denotes a vector indicating an Rx noise and interference. It is assumed that a channel has a frequency flat characteristic in a specific narrowband.

According to Equation 8, the Rx signal y of the UE can be expressed by a sum of products of a channel matrix $H_i$ for the UE and the node i, a compressed MIMO precoding matrix $\tilde{V}_i$, and a Tx stream vector $s_i$. That is, the Rx signal of the UE can be expressed in a form of a sum of signals received from respective nodes, and is affected by the compressed MIMO precoding matrix $\tilde{V}_i$.

By considering this, the MIMO precoder in the multi-node system can constitute a MIMO precoding matrix by including a per-node power factor. That is, a MIMO precoding matrix $V_i$ of a node i can be expressed by Equation 9 below.

$$V_i = \alpha_i \hat{V}_i, i=1, \ldots, N \qquad \text{[Equation 9]}$$

In Equation 9, $\alpha_i$ denotes a power factor at a node i. In Equation 9, $\hat{V}_i$ is an $N_{t,i} \times N_s$ matrix. Equation 9 can also be expressed by Equation 10 below.

$$\tilde{V}_i = \alpha_i \tilde{V}_i, i=1, \ldots, N \qquad \text{[Equation 10]}$$

In Equation 10, $\tilde{V}_i$ is an $N_{t,i} \times N_{s,i}$ matrix. The matrix $\hat{V}_i$ or $\tilde{V}_i$ may be a MIMO precoding matrix defined based on the conventional CAS or a default MIMO precoding matrix newly defined in single node transmission.

The default MIMO precoding matrix in single node transmission uses a transmission method in which a power factor is fixed to 1. In this case, $\hat{V}_i$ or $\tilde{V}_i$ is characterized in that Tx power is normalized. For example, if codebook-based precoding is applied, $\hat{V}_i$ or $\tilde{V}_i$ can be obtained from all normalized codebooks. In the normalized codebook, each element and each row or column of a matrix and power of the matrix itself are fixed.

Figure 8:
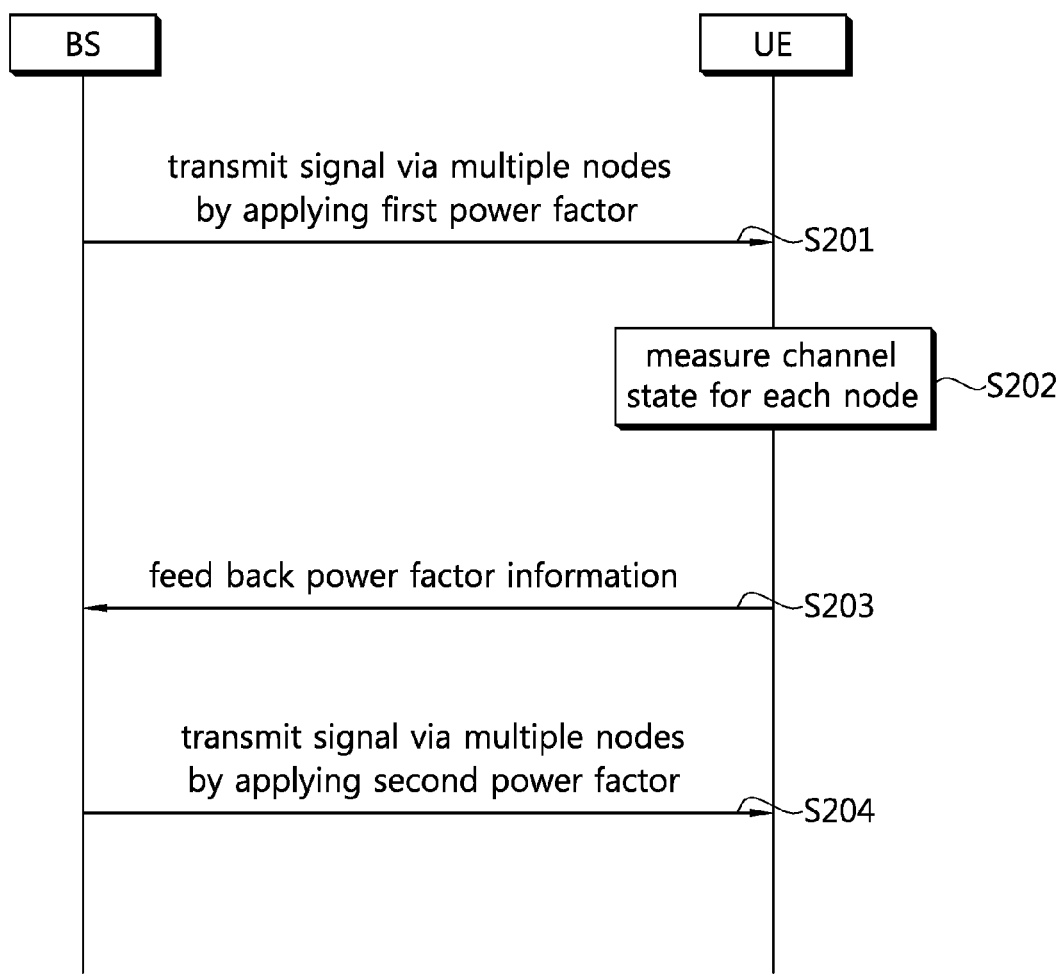
FIG. 8 shows a signalling process between a base station and a user equipment when a multiple input multiple output (MIMO) precoding matrix includes a per-node power factor.

FIG. 8 shows a signalling process between a BS and a UE when a MIMO precoding matrix includes a per-node power factor.

Referring to FIG. 8, the BS transmits a signal via a plurality of nodes by applying a first power factor (step S201). The power factor is an element for determining Tx power. The first power factor collectively indicates power factors for nodes allocated to the UE. For example, the BS can transmit a signal to the UE via a node 1 and a node 2 by using the first power factor.

The UE measures a channel state for each of the plurality of nodes (step S202). For example, the UE can measure a reference signal transmitted from each node. The reference signal can be identified by a node ID of each node or a reference signal configuration. The UE can measure a carrier to interference and noise ratio (CINR) and a received signal strength indication (RSSI) for a signal transmitted from each node. Alternatively, the UE can measure signal strength or quality information for a reference signal, for example, reference signal received power (RSRP), reference signal received quality (RSRQ), channel quality indicator (CQI), etc.

The UE feeds back power factor information to the BS on the basis of the channel state measurement (step S203).

Herein, the power factor information implies a signal which requests the BS to control power for a specific node.

The power factor information can be implemented in various forms.

For example, the UE can request the power factor control by transmitting a per-node preferred power factor, of which the number of bits is fixed, to the BS together with information capable of identifying a node. In this case, a table in which a per-node power factor value is predetermined according to a bit value thereof may exist between the BS and the UE. Then, the BS can recognize a power factor value based on a bit value in the table. That is, the power factor value can be provided in an index form of the predetermined table. The table may be as follows, for example.

TABLE 3

| Feedback bit | Power factor value (dB) |
|---|---|
| 00 | 0 |
| 01 | 0.5 |
| 10 | 1 |
| 11 | 2 |

Referring to Table 3, the UE transmits a power factor value consisting of 2 bits to the BS together with node identification information. With respect to a node specified by the node identification information, if the bit value of 2 bits is '00', '01', '10', or '11', then the power factor can be determined respectively to '0', '0.5', '1', or '2'.

Alternatively, the power factor information can be given in a form of node identification information (e.g., a node index) or a matrix index. Herein, the matrix index may be information indicating a matrix selected in a codebook which is a set of matrices for specifying a predetermined power factor of each node.

Alternatively, the UE can feed back information on the power factor in an event-driven manner. For example, the UE can include a power control field and a node index (or a corresponding reference signal index) in the information to be fed back. The power control field may consist of one bit. The BS can decrease Tx power of a node indicated by the index if a field value of the power control field is 1, and can increase the Tx power of the node indicated by the node index if the field value of the power control field is 0 (the other way around is also possible). For example, the UE can feed back a power factor increase request for a node 1 if a channel state with respect to the node 1 is not good. Alternatively, the UE can feed back a power factor decrease request for a node 2 if a channel state with respect to the node 2 is good. The power factor increase or decrease request can be identified by a value of the power control field.

Alternatively, when indicated, an increment value or decrement value of the power factor can be classified into several levels as shown in Table 4 below.

TABLE 4

| Power control field | Power factor variation (dB) |
|---|---|
| 0 | 0 |
| 1 | −0.5 |
| 2 | +0.5 |
| 3 | −1 |
| 4 | +1 |

The BS transmits a signal via a plurality of nodes by applying a second power factor (step S204). The second power factor can be determined based on a power factor information transmitted by the UE. To determine the second power factor, the BS can use one of the following two methods.

First, the BS controls Tx power of nodes which transmit signals to the UE by using the second power factor, and thus can transmit a codeword by using the same MCS. Since a path loss between each node and the UE is different from each other in a multi-node system, link quality from each node may show a significant difference. As one method for dealing with this situation, a different MCS is applied to each node. However, this method requires a CQI feedback for each codeword and control information signalling for an MCS, which results in a problem in that a signalling overhead is increased. In addition, if a single MCS is applied in a situation in which a path loss is different, there is a problem in that an MCS for a node having the worst channel state is applied to all nodes.

To solve this problem, link quality needs to be equalized for all nodes. For this, among nodes allocated to the UE or nodes selected by the UE, the BS can increase Tx power for nodes having a bad channel state ($\alpha_i > 1$), and can decrease Tx power for nodes having a good channel state ($\alpha_i < 1$). Whether the channel state is good or bad can be determined according to a predetermined threshold. The first power factor and the second power factor are included in control information transmitted by the BS.

If Tx power is controlled for the purpose of transmitting a codeword to which the same MCS is applied in a plurality of nodes as described above, the UE may feed back only one MCS to be applied commonly to all nodes.

When feeding back a PMI, the UE can feed back information on precoding for each node or for each CSI-RS pattern. That is, the UE can feed back a PMI applied to steps 403-1 to 403-N of FIG. 5 or a PMI corresponding to $\tilde{V}_i$ in Equation 10. In this case, only one CQI value can be fed back to indicate an MCS to be commonly applied to all nodes or CSI-RS patterns. In doing so, it is possible to transmit a codeword to which the same MCS is applied for a plurality of nodes, and thus a single CQI feedback for the plurality of nodes or a CSI-RA pattern can be supported.

Second, in case of allowing transmission of a codeword by using a different MCS for each node, the BS can perform power allocation to maximize link capacity. That is, among nodes allocated by the BS or selected by the UE, transmission itself is suspended for nodes having a bad link state instead of performing transmission with a low transfer rate by applying a lower MCS level (herein, $\alpha_i = 0$ is applied), whereas Tx power is increased to apply a higher MCS level to a node having a good link state (herein, $\alpha_i > 1$ is applied). As well known in a MIMO capacity theory, a water filling power control mechanism is used to maximize capacity.

In the aforementioned method, eventually, the BS discriminates downlink Tx power for each node. The reason of discriminating the Tx power for each node is to achieve the following two purposes.

1. To apply a codeword of the same MCS in a plurality of nodes.
2. To maximize link efficiency.

Hereinafter, a signalling process between a BS and a UE will be described for a case where a multi-node system uses the signal transmission system of FIG. 7.

If $N_r$ denotes the number of Rx antennas of the UE, $N_t$ denotes the total number of Tx antennas of the multi-node system, and $H_i$ denotes an $N_r \times N_{t,i}$ matrix corresponding to an $i^{th}$ node in an $N_r \times N_t$ channel matrix H for the UE, then an Rx signal y of the UE can be expressed by Equation 11 below.

$$y = Hx + z \quad \quad \text{[Equation 11]}$$
$$= HVs + z$$
$$= \sum_{i=1}^{N} H_i x_i + z$$
$$= \sum_{i=1}^{N} H_i V_i s + z$$
$$= \sum_{i=1}^{N} H_i \tilde{V}_i s_i + z$$

If the multi-node system performs a MIMO operation according to the conventional CAS-based communication standard, signal transmission and MIMO precoding matrix selection are performed based on a PMI feedback of a UE with respect to a MIMO precoding matrix V.

However, the number of Tx antennas in the multi-node system may be more various than a case of using the CAS. For example, assume that the number of Tx antennas of a node 1 is 4, the number of Tx antennas of a node 2 is 2, the number of streams mapped to the node 1 is 2, the number of streams mapped to the node 2 is 1, and the maximum rank of the overall multi-node system is 2. In this case, since the total number Nt of Tx antennas is 6 and the maximum rank is 2, a 6×2 MIMO precoding matrix V is defined. To perform a codebook-based close-loop feedback, a 6×2 codebook must be newly designed, and $1^{st}$ and $2^{nd}$ columns of $5^{th}$ and $6^{th}$ rows of a MIMO precoding matrix in a codebook which satisfies the above example must be 0. This is because rank-1 transmission is performed at the node 2. It is difficult to define a codebook which satisfies such various restrictions.

In order to solve this problem, a MIMO precoding matrix can be defined for each node. That is, the MIMO precoder per node is defined and applied. For this, the BS can transmit not only all rank values but also a 'per-node rank value' by including them to control information. In addition, the number of Tx antennas for each node and stream-node mapping information can be transmitted by including them to the control information.

For example, the BS can report to the UE a value $N_{s,i}$ which is the number of streams mapped to an $i^{th}$ node, where the value $N_{s,i}$ can be a rank value of the $i^{th}$ node. In addition, the BS can report a Tx stream vector $s_i$ of an $i^{th}$ node from a Tx stream matrix s by using stream-node mapping information. Then, the UE can find a PMI for a corresponding node from a codebook consisting of $N_{t,i} \times N_{s,i}$ MIMO precoding matrices. In this case, the UE can find a PMI suitable for each node allocated to the UE by using Equation 10. The BS can configure a MIMO precoding matrix (i.e., a MIMO precoder) from per-node PMI information which is fed back by the UE.

If the control information does not include the stream-node mapping information, the UE can find a per-node PMI set and feed back a part or entirety of it by assuming various stream-node mappings. In this case, a stream-node mapping relation can be included in feedback information in the UE.

If the control information does not include a per-node rank value in the BS, the UE feeds back a preferred per-node rank value by assuming various per-node rank values. In addition, the UE feeds back to the BS a per-node PMI set for a rank value for each preferred node.

For example, if the BS determines an overall rank to 4 in a system in which a node 1 has 4 Tx antennas and a node 2 has 4 Tx antennas, the UE finds a per-node PMI set for each combination by assuming various combinations by which four streams can be allocated to two nodes. Examples of nodes mapped to four streams in an orderly manner may include {1,1,1,1}, {1,1,1,2}, {1,1,2,2}, etc. Per-node PMI sets are found for such various combinations, and a PMI set for each of some or all of the most preferred nodes is fed back.

In this case, the UE may allow feedback information to include stream-node mapping information, a per-node rank value, and an overall rank value. The overall rank value is included in the feedback in addition to the per-cell rank value because a sum of per-node rank values becomes greater than the full rank value when some of streams are mapped to multiple nodes.

If preferred stream-node mapping information is configured in a form of specifying a stream mapped to a node, the per-node rank value and the overall rank value can be omitted. For example, if preferred stream-node mapping information is given in such a manner that a stream index mapped to a node 1 is {1, 2} and a stream index mapped to a node 2 is {2, 3, 4}, a per-node rank value for the node 1, a per-node rank value for the node 2, and an overall rank value are implicitly indicated as 2, 3, and 4, respectively. Therefore, the per-node rank value and the overall rank value can be omitted.

A feedback of the per-node rank value can be regarded as an implicit indication of an index feedback for a node preferred by the UE. The BS can perform dynamic node switching by using the per-node rank value fed back by the UE. If the BS allocates a node set consisting of N nodes to the UE, the number of nodes preferred by the UE may be instantaneously less than N. In this case, if the UE sets a per-node rank value for a non-preferred node to 0 and feeds back it, the BS can change a node set for supporting the UE.

For example, assume that the BS allocates three nodes semi-statically to the UE by using control information. The UE can feed back a per-node rank value for the three nodes. If the per-node rank value for the three nodes is indicated as {1, 1, 2}, {1, 2, 2}, etc., the UE can feed back, for example, {1,0,3}. This implies information indicating that it is desirable to support a rank 1 for a first node and a rank 3 for a third node for the UE by excluding a second node among three allocated nodes. The BS can perform dynamic node switching on the basis of the per-node rank value fed back by the UE. Likewise, the BS can allow the per-node rank value to be included in control information, and can report node information which changes dynamically to the UE by setting a per-node rank value for a specific node to 0.

Hereinafter, a feedback of channel quality information (CQI) of a UE in a multi-node system will be described. In a narrow sense, the CQI is information for reporting to a BS an MCS level that can be received with performance within a predetermined reception error rate. Alternatively, in a broad sense, the CQI is information for reporting to the BS a current channel state. The CQI can be used by being classified into an average CQI, a differential CQI, a wideband CAI, a subband CQI, etc. In general, the UE measures CQI values for respective codewords, and feeds back all or some of the values. However, multi-user (MU) MIMO transmission has an exception in that a CQI value for a preferred stream is measured and fed back together with preferred stream information (IEEE 802.16m open-loop MU-MIMO).

In a multi-node system, not only an overall CQI value for an overall Tx antenna but also per-node CQI information can be included in feedback information when a UE feeds back CQI. The per-node CQI information implies CQI information for some Tx antennas or some streams. When feeding back the per-node CQI information, the per-node CQI information must be included instantaneously in feedback information for all nodes supporting the UE. This is because it is difficult to determine an MCS level for another node supporting the UE when using only per-node CQI information for some nodes supporting the UE. In particular, since a path loss is different for each node in the multi-node system, such a characteristic is more apparent. The per-node CQI information can be used when the BS reports an MCS level applied to each node by using downlink control information.

If the multi-node system supports dynamic node switching or if a per-node CQI feedback period is relatively slow, a node configuration (or stream-node mapping) for a case where per-node CQI information is configured may be different from a node configuration (or stream-node mapping) for a case of actual data transmission.

For example, assume that the BS allocates nodes 1, 3, and 4 to a UE 1, and the UE 1 feeds back per-node CQI information for these three nodes. The BS can transmit data by using only some nodes among the three nodes when actual data transmission is achieved for the UE 1 when the UE requests a data. That is, if a node for which the UE feeds back per-node CQI information differs from a node for which the BS transmits data at a later time, CQI information is mismatched.

Alternatively, there may be a situation in which the UE obtains and feeds back per-node CQI information for a case where different one stream is mapped to each node, but some nodes transmit multiple streams in actual data transmission. The mismatch of CQI information also occurs in such a situation.

In order to avoid the occurrence of CQI mismatch, the UE can add a CQI compensation value to a feedback. The CQI compensation value implies a difference between CQI values for a case where a transmission mode (i.e., the number of nodes for transmitting signals, stream-node mapping) assumed when the UE feeds back CQI is different from a node which is set when the BS actually transmits data. For example, when the UE sends three CQI values for three nodes by assuming that the three nodes are allocated, a difference value indicating how much the CQI value changes can be transmitted together as the CQI compensation value when only specific two nodes or one node participate in transmission among the three nodes.

Alternatively, per-node CQI information can be defined for a case where only a corresponding node participates in transmission. The CQI compensation value can be defined as information indicating how much the per-node CQI information is changed due to an interference if another node also supports the UE together.

The CQI compensation value is obtained by assuming various cases, and thus can be fed back only with a relatively long period, i.e., semi-statically, or can be fed back only for some limited cases. For example, the CQI compensation value can be fed back by limiting to a CQI increase amount for a case where the number of nodes is decreased by one node in comparison with a node configuration when performing a current CQI feedback.

In the multi-node system using the aforementioned signal transmission systems, the UE can estimate a channel matrix $H_i$ (i=1, 2, ..., N) by using a reference signal corresponding to each node. The UE uses the channel matrix $H_i$ to find and feed back an overall rank value, a per-node rank value, and a corresponding preferred per-node PMI.

In addition, in case of applying the per-node PMI, a per-node CQI value is fed back by measuring a per-node MCS level applicable to each node. The CQI compensation value can be fed back together with the per-node CQI value.

In addition, the overall rank value and the per-node rank value can be included in control information transmitted from the BS to the UE. In this case, the UE fixes a parameter to the overall rank value and the per-node rank value transmitted from the BS, and thereafter finds and feeds back the remaining parameter values to be fed back.

When the aforementioned signal transmission systems are implemented in a multi-node system, various stream-node mappings can exist, which may result in an excessive increase in a feedback overhead of the UE. If the feedback overhead exceeds a range supported by the UE or the multi-node system, the following method can be used to decrease the feedback overhead. 1. The BS can designate stream-node mapping information by transmitting control information including the stream-node mapping information. 2. A default stream-node mapping relation is defined by using a predetermined standard, and the UE feeds back a PMI by assuming the default stream-node mapping if there is no special request of the BS.

Herein, the default stream-node mapping may be a mapping scheme in which one stream is allocated to all nodes. That is, a default value of an overall rank is equal to the total number of nodes, and a per-node rank value for each node is set to 1.

If there is no special request from the BS, the UE configures feedback information by assuming that $1^{st}$, $2^{nd}$, ..., $N^{th}$ streams are mapped respectively to nodes 1, 2, ..., N.

The per-node rank value is set to 1 because there is a high possibility that each node has significantly lower Tx power than the conventional macro cell tower in the multi-node system and thus there is a high possibility that the number of Tx antennas in each node is not great. In other words, a possibility that the per-node rank value is greater than or equal to 2 is not great. In addition, there is a high possibility that a characteristic of a channel from each node installed at a physically different location has a very low spatial correlation of a channel between the respective nodes, and thus there is a high possibility that no problem occurs in transmission of independent streams.

The UE can estimate a channel from each node and thereafter can find a per-node PMI for each node from a rank-1 codebook, that is, a codebook including $N_{t,i} \times 1$ vectors, and then can feed back the PMI. In this case, stream-node mapping information can be omitted from the feedback information, and PMI and CQI feedback information can also be limited to a per-node PMI and per-node CQI when the number of nodes is equal to the number of allocated nodes, and thus a feedback overhead is not great.

In the aforementioned description of the present invention, a term 'node' includes not only a physical node but also a logical node. The logical node implies a node which is recognized as a node from the viewpoint of the UE. The physical node and the logical node may be related in a 1:1 manner, but the present invention is not limited thereto. For example, if a plurality of physical nodes share one reference signal (pilot) pattern, a plurality of physical nodes which share the single signal (pilot) pattern may correspond to one logical node.

For example, in an LTE system, one CSI-RS pattern consists of 1, 2, 4, or 8 Tx antenna ports. In general, one CSI-RS pattern is transmitted from one physical node. However, if one CSI-RS pattern consisting of 8 antenna ports is transmitted by being divided into two physical nodes each of which has four Tx antennas, the UE recognizes the two physical nodes as one physical node. In this case, the UE can perform a per-node CSI feedback from the viewpoint of a logical node, which implies that the UE recognizes the two physical nodes as one node, and performs one CSI feedback for a system having 8 Tx antennas. Therefore, a per-node PMI, a per-node CQI, a per-node rank, or the like described in the present invention may imply PMI, CQI, rank information, or the like for each physical node, or may imply PMI, CQI, rank information, or the like for each logical node.

In addition, from the viewpoint of the UE, a node (i.e. physical node or logical node) is identified by a reference signal (pilot) having a different configuration. For example, in case of LTE-A, from the viewpoint of the UE, a logical node can be classified according to a CSI-RA having a different configuration. In this case, the per-node feedback information described in the present invention implies a PMI, CQI, and rank for each CSI-RS. In addition, per-node transmission information transmitted by the BS to the UE implies configuration information for each CSI-RS.

Figure 9:
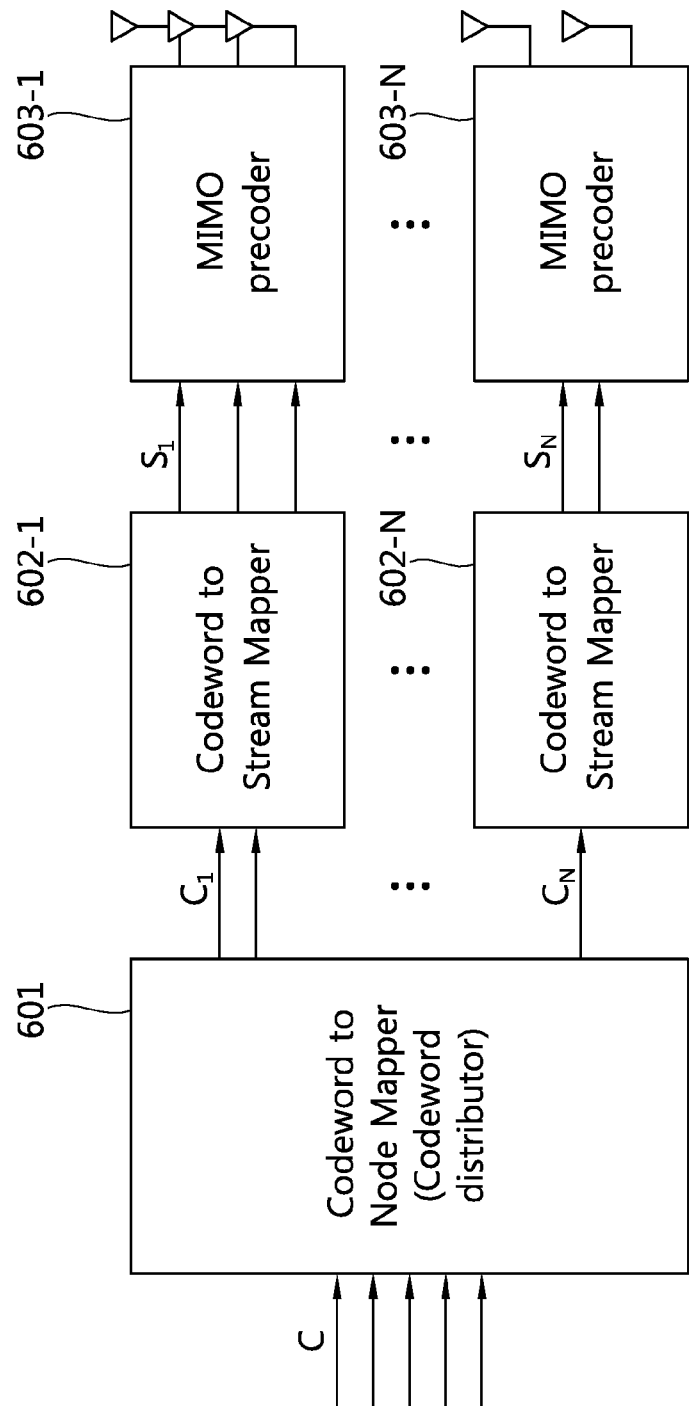
FIG. 9 shows a signal transmission system according to another embodiment of the present invention.

FIG. 9 shows a signal transmission system according to another embodiment of the present invention.

Referring to FIG. 9, the signal transmission system includes a codeword-node mapper 601, codeword-stream mappers 602-1, ..., 602-N, and MIMO precoders 603-1, ..., 603-N. The codeword-node mapper 601 maps all codewords to each node. That is, instead of first mapping a codeword to a stream and then mapping it to each node, a codeword is mapped to a node. When the signal transmission system is configured as shown in FIG. 9, codeword-node mapping information may be included in information fed back by a UE to a BS or control information transmitted by the BS to the UE.

Mapping between a codeword and a node can be set as a requirement by default to allocate one codeword per node. In this case, signaling of codeword-node mapping information may be necessary only when this requirement is not met. Accordingly, a signaling overhead is decreased.

The codeword-node mapping information may include two fields, for example, a message field A and a message field B. In this case, if the message field A is 0, a codeword mapped to a node specified in the message field B can be increased (in case of LTE-A, increased to 2), and if the message field A is 1, a codeword for a node set specified in the message field B can be shared. The increasing in the codeword for the specific node can be determined at the request of the UE or by the decision of the BS if a quality difference becomes significant between streams mapped to the node and thus it is not suitable to use the same MCS. The sharing of the codeword for the specific node set can be requested by using a control message by the BS or by using a feedback message of the UE when node sets have similar quality and thus it is intended to decrease a signaling overhead by distributing one codeword to a plurality of nodes.

In the conventional standard, up to two codewords are allocated to the UE. However, each node may have a different path loss in a multi-node system. Therefore, performance can be maximized when a different MCS is applied to each node. For this, the number of supportable codewords is preferably equal to the maximum number of nodes that can be supported to one UE in the multi-node system. In this case, a codeword-node mapper can be utilized instead of the stream-node mapper.

The aforementioned method and apparatus can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

The invention claimed is:

1. A method of transmitting a signal of a multi-node system employing a plurality of nodes and a base station for connecting with each of the plurality of nodes, the method comprising:
   transmitting a first signal to a user equipment via the plurality nodes by applying a first power factor;
   receiving power factor information as a feedback from the user equipment; and
   transmitting a second signal to the user equipment via at least one node among the plurality of nodes by applying a second power factor,
   wherein the first power factor and the second power factor are elements for determining transmit power to be applied to the plurality of nodes,
   wherein the power factor information includes information for transmit power applicable to each of the plurality of nodes by measuring the first signal,
   wherein the second power factor is determined based on the power factor information,
   wherein the power factor information includes a node index for indicating a specific node among the plurality of nodes and a power control field for requesting an increase or decrease of transmit power of the specific node,
   wherein the second signal includes codewords, and a same modulation and coding scheme (MCS) is applied to the codewords,
   wherein the plurality of nodes represent a plurality of antennas or antenna groups which is separated from a distributed antenna system (DAS),
   wherein the power factor information includes information on one MCS commonly applied to all nodes which transmit the second signal, and
   wherein a matrix index is used to indicate a matrix selected in a codebook, which is a set of matrices for specifying a predetermined power factor of each node of the plurality of nodes.

2. The method of claim 1, wherein the power factor information includes a power factor preferred by the user equipment for each of the plurality of nodes.

3. The method of claim 2, wherein the power factor preferred by the user equipment is provided in an index form of a predetermined table between the base station and the user equipment.

4. The method of claim 1, wherein the second power factor increases the transmit power for a node of which a channel state is below a threshold and decreases the transmit power for a node of which a channel state is above the threshold among the plurality of nodes.

5. The method of claim 1, wherein the second power factor determines the transmit power to zero for a node of which a channel state is below a threshold and increases the transmit power for a node of which a channel state is above the threshold among the plurality of nodes.

6. The method of claim 1, further comprising:
   transmitting information indicating the first power factor or the second power factor to the user equipment.

7. The method of claim 6, wherein the information indicating the first power factor or the second power factor is included in control information transmitted by the base station.

8. A method of transmitting a signal of a user equipment in a multi-node system employing a plurality of nodes and a base station for connecting with each of the plurality of nodes, the method comprising:
   receiving a first signal to which a first power factor is applied via the plurality of nodes;
   feeding back power factor information to the base station; and
   receiving a second signal to which a second power factor is applied via at least one node among the plurality of nodes,
   wherein the first power factor and the second power factor are elements for determining transmit power to be applied to the plurality of nodes,
   wherein the power factor information includes information for transmit power applicable to each of the plurality of nodes by measuring the first signal,
   wherein the second power factor is determined based on the power factor information, wherein the power factor information includes a node index for indicating a specific node among the plurality of nodes and a power control field for requesting an increase or decrease of transmit power of the specific node, wherein the second signal includes codewords, and a same modulation and coding scheme (MCS) is applied to the codewords, wherein the plurality of nodes represent a plurality of antennas or antenna groups which is separated from a distributed antenna system (DAS), wherein the power factor information includes information on one MCS commonly applied to all nodes which transmit the second signal, and wherein a matrix index is used to indicate a matrix selected in a codebook, which is a set of matrices for specifying a predetermined power factor of each node of the plurality of nodes.

9. The method of claim 8, wherein the power factor information includes a power factor preferred by the user equipment for each of the plurality of nodes.

10. The method of claim 9, wherein the power factor preferred by the user equipment is provided in an index form of a predetermined table between the base station and the user equipment.

11. The method of claim 8, further comprising feeding back information on a precoding matrix applicable to the plurality of nodes.

* * * * *